(12) United States Patent
Fusegi et al.

(10) Patent No.: US 8,858,384 B2
(45) Date of Patent: Oct. 14, 2014

(54) BEVEL GEAR AND DIFFERENTIAL DEVICE THEREWITH

(71) Applicant: GKN Driveline Japan Ltd., Tochigi (JP)

(72) Inventors: Masaaki Fusegi, Tochigi (JP); Yasuo Yamanaka, Oyama (JP)

(73) Assignee: GKN Driveline Japan Ltd, Tochigi (JP)

( * ) Notice: Subject to any disclaimer, the term of this patent is extended or adjusted under 35 U.S.C. 154(b) by 43 days.

(21) Appl. No.: 13/787,602

(22) Filed: Mar. 6, 2013

(65) Prior Publication Data

US 2013/0237363 A1    Sep. 12, 2013

(30) Foreign Application Priority Data

Mar. 9, 2012    (JP) .................. 2012-052645

(51) Int. Cl.
*F16H 48/08*    (2006.01)
*F16H 48/24*    (2006.01)
*F16H 55/17*    (2006.01)

(52) U.S. Cl.
CPC ............... *F16H 48/08* (2013.01); *F16H 48/24* (2013.01); *F16H 2055/178* (2013.01); *F16H 55/17* (2013.01)
USPC ............. 475/231; 475/230; 475/344; 74/423; 192/84.92; 192/108; 192/69; 192/69.7

(58) Field of Classification Search
USPC ........... 475/230, 231; 74/423; 192/84.92, 108
See application file for complete search history.

(56) References Cited

U.S. PATENT DOCUMENTS

| | | | |
|---|---|---|---|
| 1,706,791 A * | 3/1929 | Leighton | 29/893.36 |
| 6,432,020 B1 * | 8/2002 | Rivera et al. | 475/231 |
| 7,775,926 B2 * | 8/2010 | Sugaya et al. | 475/85 |

FOREIGN PATENT DOCUMENTS

JP    2008-281194 A    11/2008

* cited by examiner

*Primary Examiner* — Edwin A Young
*Assistant Examiner* — Colby M Hansen
(74) *Attorney, Agent, or Firm* — Bejin Bieneman PLC

(57) ABSTRACT

A bevel gear used in a differential device for a vehicle is comprised of: a body having an axis, a conical pitch surface around the axis, an opposite surface opposed to the conical pitch surface, and a side surface around the axis; gear teeth formed on the pitch surface, each of the gear teeth having a top land projecting from the pitch surface; and clutch teeth formed on the opposite surface, each of the clutch teeth having a bottom land standing back from the opposite surface, each of the bottom lands of the clutch teeth being aligned with any of the top lands of the gear teeth in a line parallel to the axis.

4 Claims, 5 Drawing Sheets

US 8,858,384 B2

BEVEL GEAR AND DIFFERENTIAL DEVICE THEREWITH

CROSS-REFERENCE TO RELATED APPLICATIONS

This application is based upon and claims the benefit of priority from the prior Japanese Patent Application No. 2012-052645 (filed Mar. 9, 2012); the entire contents of which are incorporated herein by reference.

BACKGROUND OF THE INVENTION

1. Field of the Invention

The present invention relates to a bevel gear preferably applied to a differential device for an automobile and a differential device therewith.

2. Description of the Related Art

As is known, an automobile is equipped with a differential, which distributes a driving force of an engine to right and left output axles with allowing differential motion between the axles. Some differentials have proper means for locking the differential motion between the right and left axles under control so as not to lose traction with the road particularly when one of the wheels loses contact with the road. A differential of this type is referred to as "locking differential" or "lock-up differential". JP Patent Application Laid-open No. 2008-281194 discloses a related art.

A differential is in certain cases comprised of a pair of side gears of a bevel gear type, which respectively mediate torque transmission from its gear set to the axles. The side gears respectively have gear teeth for meshing with the gear set. One of the side gears in a lock-up differential is, in general, further comprised of clutch teeth for meshing with locking means.

SUMMARY OF THE INVENTION

A side gear without clutch teeth merely have to bear relatively simple stress because transmitting torque alone is a major source of the stress. In contrast, as to a side gear with both gear teeth and clutch teeth, both the gear set and the locking means exert forces thereon. The side gear at issue must bear the complex stress and is in the prior art necessarily made in a massive form. This configuration makes the bevel gear heavier and the differential greater in axial size. The present invention is intended to provide a bevel gear and a differential device therewith with improvement in light of this problem.

According to an aspect of the present invention, a bevel gear is comprised of: a body having an axis, a conical pitch surface around the axis, an opposite surface opposed to the conical pitch surface, and a side surface around the axis; gear teeth formed on the pitch surface, each of the gear teeth having a top land projecting from the pitch surface; and clutch teeth formed on the opposite surface, each of the clutch teeth having a bottom land standing back from the opposite surface, each of the bottom lands of the clutch teeth being aligned with any of the top lands of the gear teeth in a line parallel to the axis.

According to another aspect of the present invention, a differential device for differentially distributing a driving force to first and second axles, the differential device is comprised of: a casing rotatable about an axis; a differential gear set configured to allow differential motion between the first and second axles, the differential gear set being housed in and drivingly coupled with the casing and including a first and a second side gears respectively coupled with the first and second axles, one selected from the group consisting of the first and second side gears including: a body having a conical pitch surface around the axis, an opposite surface opposed to the conical pitch surface, and a side surface around the axis; gear teeth formed on the pitch surface, each of the gear teeth having a top land projecting from the pitch surface; and clutch teeth formed on the opposite surface, each of the clutch teeth having a bottom land standing back from the opposite surface, each of the bottom lands of the clutch teeth being aligned with any of the top lands of the gear teeth in a line parallel to the axis; and a clutch device configured to controllably engage with the clutch teeth to restrict the differential motion.

DETAILED DESCRIPTION OF THE PREFERRED EMBODIMENT

Certain embodiments of the present invention will be described hereinafter with reference to the appended drawings.

Figure 1:
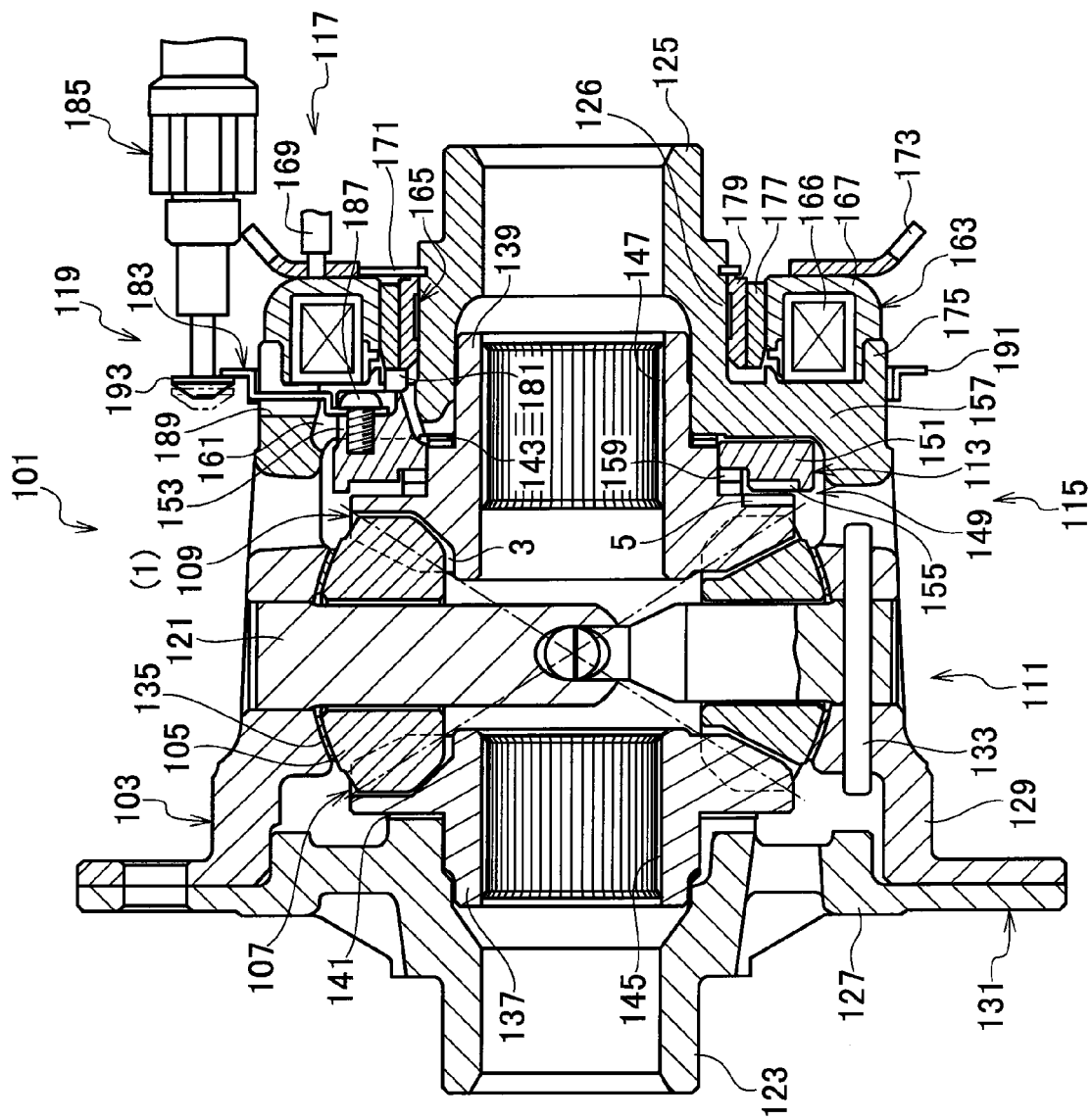
FIG. 1 is a cross sectional view of a differential device of an embodiment of the present invention.

A bevel gear 1 according to an embodiment of the present invention is preferably used in a lock-up differential device 101 of a bevel gear type exemplarily shown in FIG. 1. The differential device 101 is comprised of a casing 103 rotatable about an axis, and a differential gear set 111 with left and right side gears 105, 109 housed in and drivingly coupled with the casing 103. The casing 103 receives torque from an engine and the side gears 105, 109 are respectively drivingly coupled with left and right axles. As the differential gear set 111 allows differential motion between the left and right axles, the torque is distributed to both the axles without losing traction.

The side gears 105, 109 are formed in a bevel gear type and the bevel gear 1 of this embodiment is applied to one of the side gears, namely the right side gear 109 in this example. The differential device 101 is further comprised of a locking device 115 controllably engageable with the side gear 109 for the purpose of restricting the differential motion.

Details of the lock-up differential device 101 with the bevel gear 1 will be described hereinafter with reference to FIG. 1.

The casing 103 is comprised of paired boss portions 123, 125 axially projecting outward, which are used for rotatable support by a vehicle body. Thereby the casing 103 is rotatable about its axis. For smooth support and suppressing frictional loss, ball bearings or roller bearings may be interposed.

The casing 103 is comprised of a flange portion 131 and is preferably dividable there into two parts 127, 129. The parts 127, 129 along with a ring gear (not shown) are fixed with plural bolts and nuts so that torque input from an engine to the ring gear makes the casing 103 as a whole to rotate about the axis. This dividable configuration allows installation of internal parts in the casing 103 when the covering part 127 is detached from the main part 129.

The internal parts such as pinions 105, the side gears 107, 109, and a clutch member 113 of the locking device 115 are inserted through the opening of the main part 129 opened when the covering part 127 is detached.

The pinions 105 are respectively supported by pinion shafts 121 inserted through through-bores on a side wall of the main part 129 and are respectively secured by pins 133 inserted in directions of traverse. The number of the pinions 105 may be arbitrarily determined but may be four as an example.

The pinion shafts 121 allow rotation of the pinions 105 thereabout. To assure smooth rotation and receive thrust force on the pinions 105, each pinion 105 may have a spherical washer 135 interposed between the pinion 105 and the casing 103.

The pair of side gears 107, 109 is so disposed in the casing 103 as to mesh with the pinions 105. The side gears 107, 109 respectively have boss portions 137, 139 axially projecting, which are respectively rotatably supported by the casing 103, and further have splined internal peripheries 145, 147 for the purpose of coupling with the left and right axles, respectively. To assure smooth rotation and receive thrust force on the side gears 107, 109, each side gear 107, 109 may have a thrust washer 141, 143 interposed between the side gear 107, 109 and the casing 103.

The pinions 105, when meshing with the side gears 107, 109, form the differential gear set 111 to allow differential motion between, and distribute input torque to, the side gears 107, 109, and as well the left and right axles.

The clutch member 113 housed in the casing 103 is comprised of a base part formed in a ring shape and is so disposed as to face the right side gear 109. An internal periphery of the base part 151 is seated on the outer periphery of the boss portion 139 of the side gear 109, thereby falling in place.

On the base part 151 formed are engaging projections 153 projecting toward a side wall 157 of the casing 103 and clutch teeth 155 projecting toward the side gear 109. The side gear 109 is comprised of clutch teeth 5 corresponding to the clutch teeth 155, as described later, so that the combination of the clutch member 113 and the side gear 109 forms a locking means 149 for locking up the differential gear set 111.

The casing 103 has engaging windows 161 on its side wall 157 so formed as to respectively catch the engaging projections 153, thereby making the clutch member 113 anti-rotated relative to the casing 103. Thus, when the locking means 149 is in mesh, the side gear 109 is restricted to rotate with the casing 103 and therefore the differential motion is disabled. Both or either of the engaging projections 153 and the engaging windows 161 may be formed in a slope shape so as to form a cam that partially converts torque of the rotating casing 103 into axial force for assisting the locking means 149 to keep its meshing state.

To urge the clutch member 113 to depart from the side gear 109, a repulsive member 159 such as a coil spring may be interposed between the clutch member 113 and the side gear 109.

To actuate the clutch member 113 toward the side gear 109, an actuator 117 is provided. Although any actuator such as a hydraulic device, a pneumatic device, or any mechanical device may be applied thereto, an actuator with a solenoid is exemplified in the following description.

The actuator 117 is comprised of a solenoid 163 and a moving part 165 actuated by the solenoid 163 to move the clutch member 113.

The solenoid 163 is comprised of a coil 166 and a core 167 to conduct magnetic flux generated by the coil 166. The solenoid 163 is disposed to be coaxial with the axial of the casing 103 and abuts on the side wall 157 of the casing 103. The boss portion 125 may have a stepped cylindrical portion 126 on which the solenoid 163 rests. A member 171 standing on the cylindrical portion 126 keeps the solenoid 163 in place.

The coil 166 is comprised of a conductor wire wound in a circular shape and molded with proper resin. Both ends of the wire are led out of the solenoid 163 and connected with lead wires 169 that are led to a battery via a controller (not shown). Under control by the controller, the solenoid 163 is excited.

The core 167 is made anti-rotated by an anti-rotation member 173 secured to a stationary member of the vehicle body. The core 167 alone, or in combination with the side wall 157, nearly thoroughly encloses the coil 166 but leaves a gap at the internal side thereof. The moving part 165 is so disposed as to face this gap so that the magnetic flux leaping over this gap drives the moving part 165. Either the side wall 157 or the core 167 may be comprised of an elongated portion 175 so as to ensure combination therebetween.

The moving part 165 is formed in a ring shape and fits within the inner periphery of the solenoid 163. The moving part 165 may be comprised of an armature 177 of a magnetic material and a plunger 179 of a non-magnetic material, which are drivingly coupled together. The armature 177 receives magnetic force to allow the solenoid 163 to actuate the moving part 165. The plunger 179 prevents leakage of the magnetic flux to the casing 103. Thus this combination improves energy efficiency. The member 171 prevents dislocation of the moving part 165 out of the actuator 177.

The plunger 179 is elongated toward the clutch member 113 to form pressure portions 181 that respectively get into the casing 103 through the windows 161. The pressure portions 181, when the plunger 179 is actuated by the solenoid 163, press the engaging projections 153 of the clutch member 113 to let the locking means 149 into the meshing state.

Aside from the aforementioned description, the moving part 165 may be omitted. In such modified embodiments, the solenoid 163 may be configured to be movable by itself toward the side gear 109 to actuate the clutch member 113. To mediate driving force of the solenoid 163, any intervening member such as a needle bearing or a thrust washer may be used.

The differential device 101 may be further comprised of a detector 119 for detecting position of the clutch member 113 as to whether the clutch member 113 meshes with the side gear 109. Although any proper means can be used as the detector, the detector 119 as illustrated in FIG. 1 is comprised of a follower member 183 following motion of the clutch member 113 and a switch 185 linked with the follower member 183.

The follower member 183 is formed in a flange shape with a projection projecting inward. The projection at the inside is led into the casing 103 through an opening 189 formed thereon and is connected with the clutch member 113 by a bolt 187. The flange portion 191 of the follower member 183 protrudes out of the casing 103.

The switch 185 is comprised of a knob 193 so formed as to engage with the follower member 183. When the clutch member 113 moves, the follower member 183 follows its motion and accordingly pulls the knob 193, thereby switching the switch 185 on or off. Thus the detector 109 can detect position of the clutch member 113 as to whether the clutch member 113 meshes with the side gear 109.

Descriptions about the bevel gear 1, used as the side gear 109 in the differential device 101 as described above, will be given hereinafter with reference to FIGS. 2A through 4B.

The bevel gear 1 is comprised of a body formed in a cylindrical shape in general but having a flange like projection at one end. The flange like portion has a conical pitch surface around the axis, on which the gear teeth 3 are formed for meshing with the pinions 105. On an opposite surface opposed to the conical pitch surface formed are the clutch teeth 5 for meshing with the clutch teeth 155 of the clutch member 113. The boss portion 139 as a part of the cylindrical portion of the bevel gear 1 axially projects from the opposite surface. On the internal periphery of the boss portion 139 formed is the splined portion 147 for coupling with the axle.

Figure 2A:
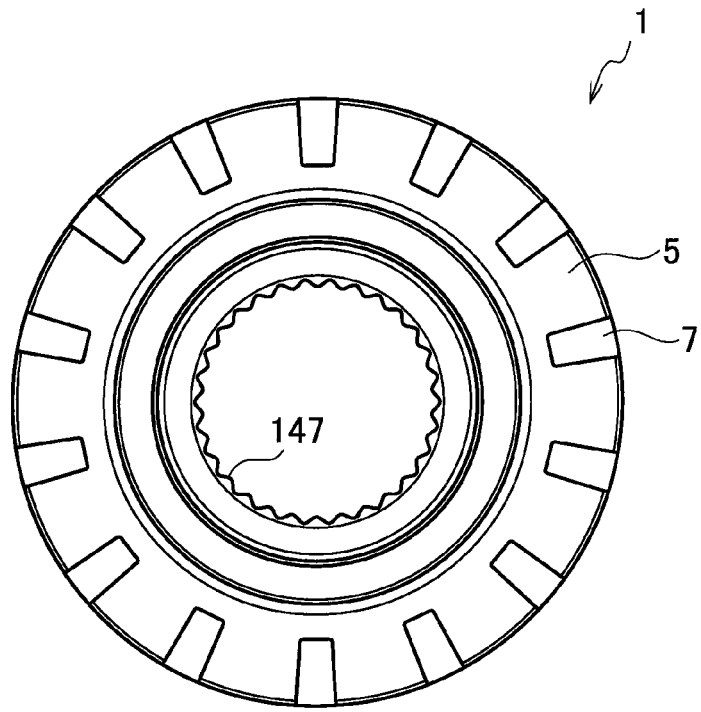
FIG. 2A is an elevational view of a bevel gear of the embodiment, which is viewed from a side opposite to gear teeth.
Figure 3A:
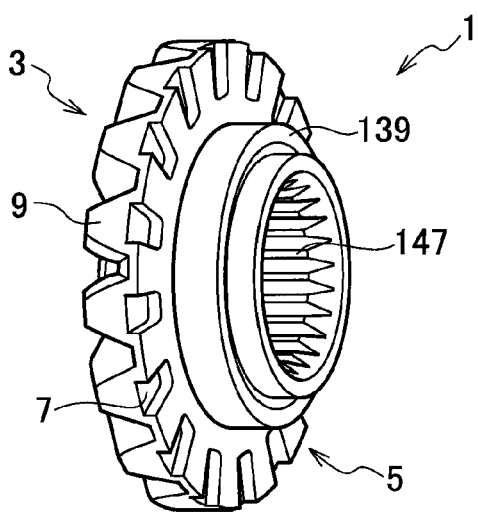
FIG. 3A is a perspective view of the bevel gear.
Figure 4A:
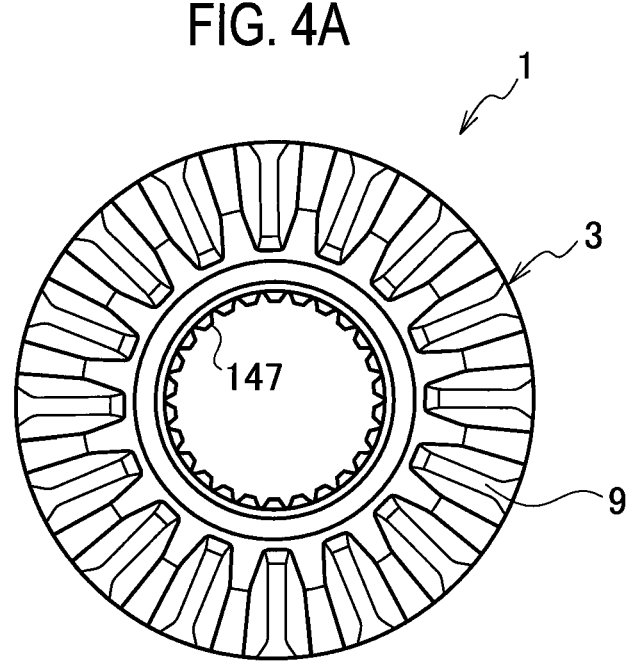
FIG. 4A is an elevational view of the bevel gear, which is a side of the gear teeth.
Figure 4B:
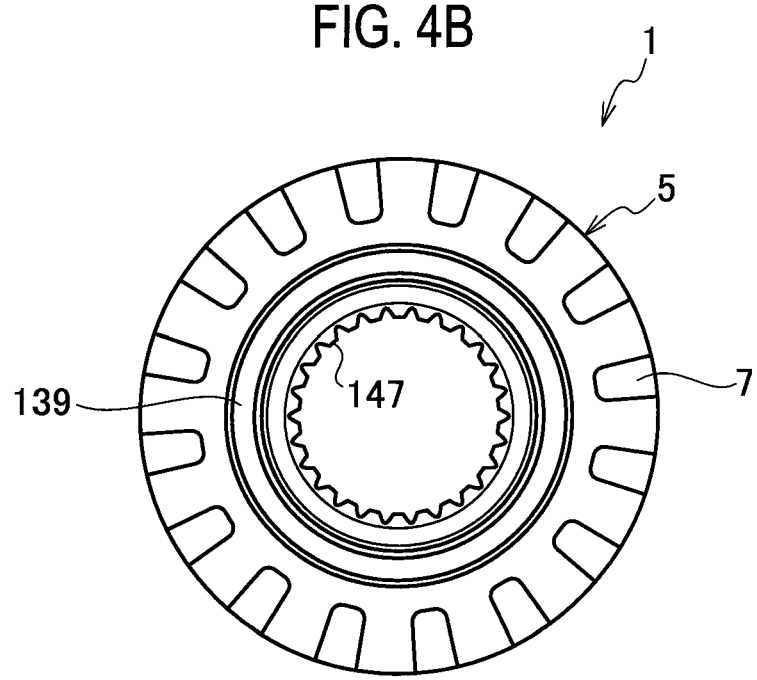
FIG. 4B is an elevational view of the bevel gear, which is viewed from a side opposite to the side shown in FIG. 4A.

Typically, as clearly shown in FIGS. 2A, 3A and 4B, plural troughs standing back from the opposite surface are formed on the opposite surface of the bevel gear 1, thereby forming the clutch teeth 5. The troughs may be either opened or closed outward at the side surface of the body of the bevel gear 1. Bottoms of the troughs function as bottom lands 7 of the clutch teeth 5 where the top lands of the clutch member 113 rest. Side faces of the troughs may stand upright or oblique or may be rounded. Oblique or rounded faces can reduce shearing stress on the teeth 5.

The bottom lands 7 of the clutch teeth 5 are put in a particular dimensional relationship with top lands 9 of the gear teeth 3. More specifically, as clearly shown in FIGS. 3A and 3B, each of the bottom lands 7 of the clutch teeth 5 is aligned with any of the top lands 9 of the gear teeth 3 in a line parallel to the axis. The number of the clutch teeth 5 is necessarily less than or equal to the number of the gear teeth 3. Preferably, the number of the clutch teeth is the same as the number of the gear teeth 3. Then the bottom lands 7 and the top lands 9 establish the one-for-one relationship as shown in these drawings.

Figure 5:
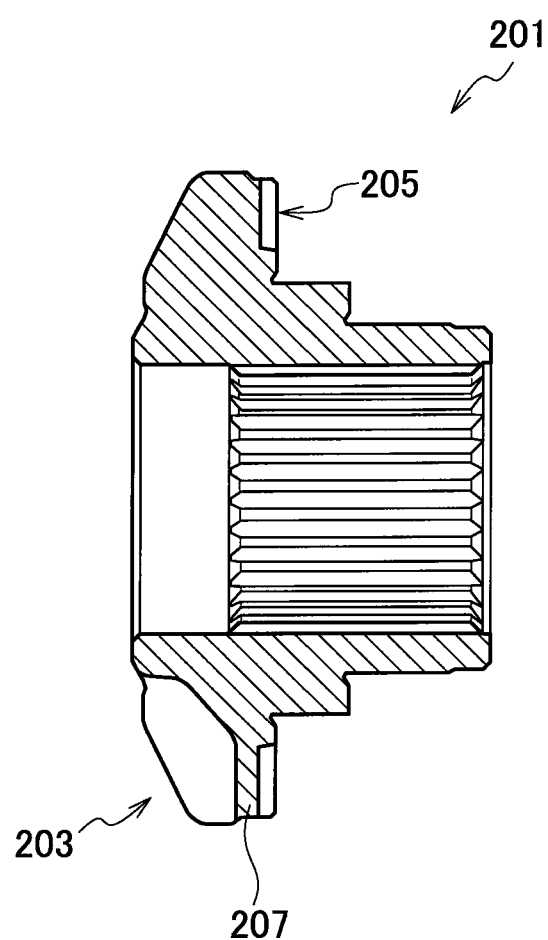
FIG. 5 is a cross sectional view of a bevel gear of the prior art.

Effects and benefits of the present embodiment will be discussed on the basis of comparison with the prior art configuration as shown in FIG. 5. A pinion in mesh with a bevel gear exerts a force mainly perpendicular to a tooth surface on the bevel gear. When a clutch member also meshes with the bevel gear, the clutch member exerts a counter force on the clutch teeth of the bevel gear. Because the points of action of these forces are offset in the axial direction, these counter forces often generate relatively large twisting stress acting on a part between the gear teeth and the clutch teeth of the bevel gear.

In a bevel gear 201 according to the prior art, the part 207 between the gear teeth 203 and the clutch teeth 205 was made relatively thick so as to bear relatively great stress including this twisting stress. In contrast in the present embodiment, because each of the bottom lands 7 of the clutch teeth 5 is aligned with any of the top lands 9 of the gear teeth 3, the force acting on the gear teeth 3 is directed straight to the meshing clutch teeth 5, 155 with a small offset. Twisting stress is made to be very low. The bevel gear 1 of the present embodiment merely has to bear a substantially simple compression stress.

Figure 2B:
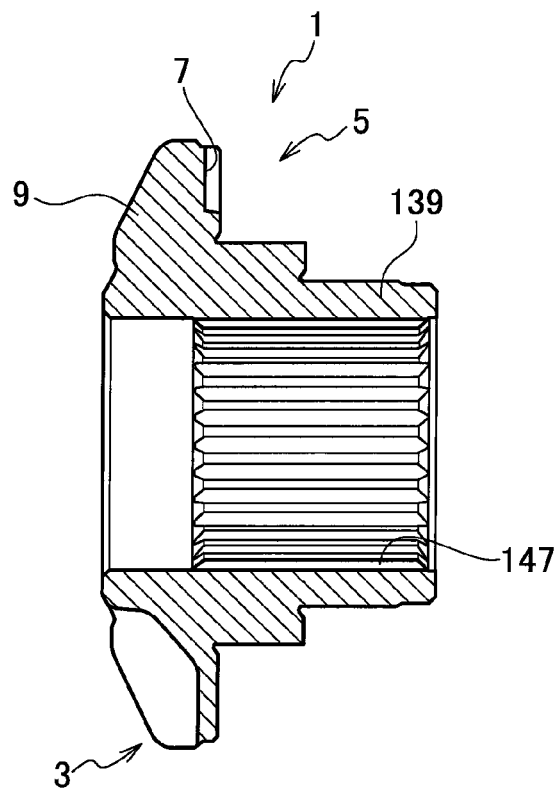
FIG. 2B is a cross sectional view of the bevel gear.
Figure 3B:
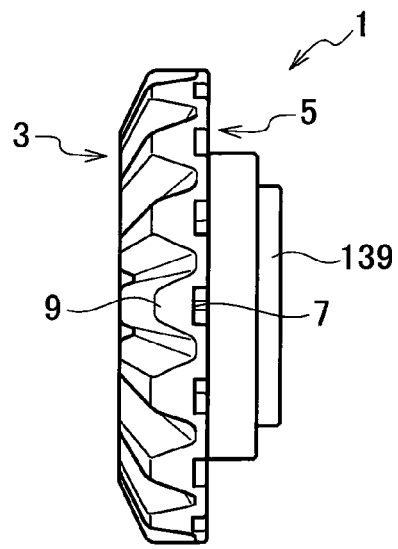
FIG. 3B is a side view of the bevel gear.
Figure 3C:
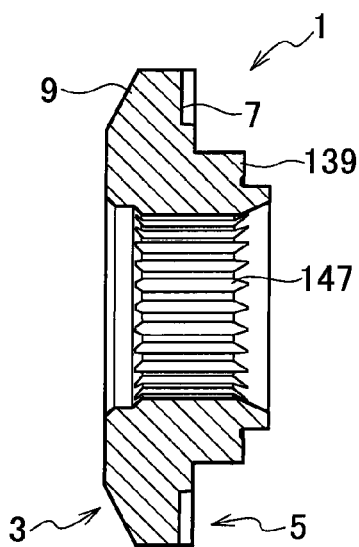
FIG. 3C is a cross sectional view of the bevel gear.

More specifically, contrary to the general knowledge, part corresponding to the part 207 is made very thin or thoroughly reduced in the present embodiment as clearly shown in FIGS. 2B, 3B and 3C. This contributes to size reduction of the differential device 101.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A bevel gear comprising:
a body having an axis, a conical pitch surface around the axis, an opposite surface opposed to the conical pitch surface, and a side surface around the axis;
gear teeth formed on the pitch surface, each of the gear teeth having a top land projecting from the pitch surface; and
clutch teeth formed on the opposite surface, each of the clutch teeth having a bottom land axially recessed from the opposite surface, each of the bottom lands of the clutch teeth being aligned with a respective one of the top lands of the gear teeth in a line parallel to the axis.

2. The bevel gear of claim 1, wherein a number of the clutch teeth is the same as a number of the gear teeth.

3. The bevel gear of claim 1, wherein the bottom lands of the clutch teeth are opened radially outward at the side surface.

4. A differential device for differentially distributing a driving force to first and second axles, the differential device comprising:
a casing rotatable about an axis;
a differential gear set configured to allow differential motion between the first and second axles, the differential gear set being housed in and drivingly coupled with the casing and including a first and a second side gears respectively coupled with the first and second axles, one selected from the group consisting of the first and second side gears including:
a body having a conical pitch surface around the axis, an opposite surface opposed to the conical pitch surface, and a side surface around the axis;
gear teeth formed on the pitch surface, each of the gear teeth having a top land projecting from the pitch surface; and
clutch teeth formed on the opposite surface, each of the clutch teeth having a bottom land axially recessed from the opposite surface, each of the bottom lands of the clutch teeth being aligned with a respective one of the top lands of the gear teeth in a line parallel to the axis; and
a clutch device configured to controllably engage with the clutch teeth to restrict the differential motion.

\* \* \* \* \*